(12) United States Patent
Noh et al.

(10) Patent No.: US 8,834,706 B2
(45) Date of Patent: Sep. 16, 2014

(54) METHOD FOR PREPARING LUBRICATING BASE OILS BY USING VACUUM DISTILLED DEASPHALTED OIL

(75) Inventors: Kyung Seok Noh, Daejeon (KR); Jae Wook Ryu, Daejeon (KR); Do Hyoun Kim, Daejeon (KR); Gyung Rok Kim, Daejeon (KR); Seung Woo Lee, Daejeon (KR); Do Woan Kim, Daejeon (KR); Sun Choi, Daejeon (KR); Seung Hoon Oh, Seoul (KR); Byung Won Yoon, Daejeon (KR); Bum Suk Chun, Daejeon (KR)

(73) Assignee: SK Innovation Co., Ltd. (KR)

( * ) Notice: Subject to any disclaimer, the term of this patent is extended or adjusted under 35 U.S.C. 154(b) by 130 days.

(21) Appl. No.: 13/701,528

(22) PCT Filed: Jun. 3, 2011

(86) PCT No.: PCT/KR2011/004074
§ 371 (c)(1),
(2), (4) Date: Dec. 13, 2012

(87) PCT Pub. No.: WO2011/152680
PCT Pub. Date: Dec. 8, 2011

(65) Prior Publication Data
US 2013/0105359 A1 May 2, 2013

(30) Foreign Application Priority Data
Jun. 4, 2010 (KR) .................. 10-2010-0052689

(51) Int. Cl.
*C10G 67/02* (2006.01)
*B01J 29/12* (2006.01)
(Continued)

(52) U.S. Cl.
CPC ............ *C10G 67/0454* (2013.01); *B01J 29/12* (2013.01); *C10G 2300/1077* (2013.01); *B01J 27/045* (2013.01); *B01J 27/049* (2013.01); *C10G 2300/206* (2013.01); *B01J 29/7492* (2013.01); *C10G 2300/4018* (2013.01); *B01J 35/0006* (2013.01); *C12N 2270/00* (2013.01); *B01J 29/85* (2013.01); *B01J 29/7415* (2013.01); *C10M 177/00* (2013.01); *B01J 29/7461* (2013.01); *C10M 2203/1006* (2013.01); *C10G 45/58* (2013.01); *C10G 65/043* (2013.01); *C01G 2300/107* (2013.01); *B01J 35/0093* (2013.01); *B01J 29/7484* (2013.01); *B01J 29/7084* (2013.01); *B01J 29/44* (2013.01); *C10G 2300/1074* (2013.01); *B01J 29/22* (2013.01); *C10G 2300/302* (2013.01); *C10G 67/02* (2013.01); *C10G 67/0463* (2013.01); *C10G 2400/10* (2013.01); *B01J 27/051* (2013.01); *C10G 59/06* (2013.01)
USPC .................. 208/49; 208/33; 208/34; 208/44; 208/45; 208/57; 208/85; 208/86; 208/309

(58) Field of Classification Search
USPC .......... 208/33-34, 44-45, 49, 57, 85-86, 309
See application file for complete search history.

(56) References Cited

U.S. PATENT DOCUMENTS 4,440,633 A * 4/1984 Jacquin et al. ........... 204/158.21
5,192,421 A 3/1993 Audeh et al.
(Continued)

FOREIGN PATENT DOCUMENTS

KR 1020030073026 A 9/2003
KR 1020030075216 A 9/2003
(Continued)

OTHER PUBLICATIONS

Supplementary European Search Report dated Jun. 25, 2014 from corresponding European Patent Application No. 11790038.

*Primary Examiner* — Brian McCaig
(74) *Attorney, Agent, or Firm* — DLA Piper LLP (US)

(57) ABSTRACT

The present invention relates to a method for preparing lubricating base oils by using vacuum distilled deasphalted oil, and more specifically, to a method for preparing various kinds of lubricating base oils by distilling a distillate obtained from a solvent deasphalting (SDA) process under reduced pressure to obtain heavy deasphalted oil (H-DAO) and light deasphalted (Lt-DAO) and then treating the H-DAO and the Lt-DAO by catalytic reactions, respectively. According to the present invention, it is possible to obtain heavy lubricating base oil (150BS) of a high viscosity grade which can not be obtained by a known catalytic reaction and a lubricating base oil of group III by hydrogenation, in a high yield, and thus economical efficiency is excellent.

11 Claims, 1 Drawing Sheet

(51) Int. Cl.

| | |
|---|---|
| *C10G 67/04* | (2006.01) |
| *B01J 27/045* | (2006.01) |
| *B01J 27/049* | (2006.01) |
| *B01J 29/74* | (2006.01) |
| *B01J 35/00* | (2006.01) |
| *B01J 29/85* | (2006.01) |
| *C10M 177/00* | (2006.01) |
| *C10G 45/58* | (2006.01) |
| *C10G 65/04* | (2006.01) |
| *B01J 29/70* | (2006.01) |
| *B01J 29/44* | (2006.01) |
| *B01J 29/22* | (2006.01) |
| *B01J 27/051* | (2006.01) |
| *C10G 59/06* | (2006.01) |

(56) References Cited

U.S. PATENT DOCUMENTS

| | | | |
|---|---|---|---|
| 5,302,282 | A | 4/1994 | Kalnes et al. |
| 2008/0289999 | A1* | 11/2008 | Lenglet .................. 208/309 |
| 2009/0020453 | A1 | 1/2009 | Tanaka et al. |
| 2009/0166253 | A1 | 7/2009 | Subramanian et al. |

FOREIGN PATENT DOCUMENTS

| | | |
|---|---|---|
| KR | 10-0841804 | 6/2008 |
| KR | 10-0934331 | 12/2009 |
| WO | 98/01515 | 1/1998 |
| WO | 2007/035380 A2 | 3/2007 |
| WO | 2009/078886 A1 | 6/2009 |
| WO | 2011/139008 A1 | 11/2011 |

* cited by examiner

METHOD FOR PREPARING LUBRICATING BASE OILS BY USING VACUUM DISTILLED DEASPHALTED OIL

RELATED APPLICATIONS

This is a §371 of International Application No. PCT/KR2011/004074, with an international filing date of Jun. 3, 2011 (WO 2011/152680, published Dec. 8, 2011), which is based on Korean Patent Application No. 10-2010-0052689 filed Jun. 4, 2010, the subject matter of which is incorporated herein by reference.

TECHNICAL FIELD

The present disclosure relates to a method of producing high-quality lubricating base oil and heavy lubricating base oil using vacuum-distilled deasphalted oil.

BACKGROUND

Conventional heavy lubricating base oils of a high viscosity grade (for example, group I: 500N, 150BS, etc.) are generally produced by introducing atmospheric residual oil and/or vacuum residual oil into a solvent deasphalting (SDA) apparatus to obtain deasphalted oil (DAO), from which asphalt and impurities were removed, and then solvent-extracting the deasphalted oil (DAO).

However, the heavy lubricating base oils produced in this way are problematic in that they do not have sufficient stability because they have a high aromatic content, and in that they cannot meet the polycyclic aromatic (PCA) content standards which have lately become much stricter. Further, these heavy lubricating base oils are problematic in that the production yield thereof is low (generally, about 40~50%) because they are produced by solvent extraction, a large amount of environmental pollutants is discharged, and an additional accompanying process is required in order to meet the PCA content standard (<3%).

Consequently, the number of factories producing lubricating base oil of group I using solvent extraction has lately decreased because of the spread of the recognition of its environmental impact and economic inefficiency.

However, the demand for heavy lubricating base oils is continuing to increase because they have very specialized uses, such as lubricating oil for automobiles, oil for fiber, paraffin-based process oil, etc. Therefore, currently, the supply of heavy lubricating base oils is not sufficiently satisfying the demand thereof.

Thus, conventionally, research into producing heavy lubricating base oils by a catalytic reaction process has been attempted. However, it is difficult to obtain high-viscosity heavy lubricating base oils, such as 150BS and the like, using conventional methods, so it is not sufficient to obtain heavy lubricating oils in the range of low viscosity to high viscosity using a single reaction process. Therefore, there is a need for producing environmentally-friendly high-quality heavy lubricating base oils in a high yield.

SUMMARY

Thus, the present disclosure describes the results of efforts that have been made to solve the above-mentioned problems. In the course of addressing these problems, it has been determined that high-viscosity grade heavy lubricating base oils (for example, 500N, 150BS, etc.) can be obtained in a high yield when heavy deasphalted oil (H-DAO) obtained by vacuum-distilling deasphalted oil (DAO) obtained from a solvent deasphalting (SDA) process goes through a catalytic reaction process in the presence of a catalyst. Further, it has been determined that high-quality heavy lubricating base oils including lubricating base oils of Group III on be produced when unconverted oil (UCO) generated from the hydrocracking process of light deasphalted oil (Lt-DAO) obtained by vacuum-distilling deasphalted oil (DAO) is used.

Accordingly, an object of the present disclosure is to provide a method of producing a high-viscosity heavy lubricating base oil (grade: 150BS), which is difficult to obtain by a conventional catalytic reaction process, in a high yield.

Another object of the present disclosure is to provide a method of producing high-quality heavy lubricating base oils including lubricating oils of Group III.

In order to accomplish the above objects, an aspect of the present disclosure provides a method of producing heavy lubricating base oil using vacuum-distilled deasphalted oil, including the steps of (a) introducing atmospheric residual oil or a mixture of atmospheric residual oil and vacuum residual oil into a solvent deasphalting apparatus to obtain deasphalted oil which does not contain asphalt; (b) vacuum-distilling the deasphalted oil to obtain light deasphalted oil and heavy deasphalted oil; (c) hydrotreating the heavy deasphalted oil obtained in the step (b) in the presence of a hydrogenation catalyst; (d) dewaxing the hydrotreated fraction (oils) obtained in the step (c) in the presence of a dewaxing catalyst; and (e) hydrofinishing the dewaxed fraction (oils) obtained in the step (d) in the presence of a hydrofinishing catalyst.

Another aspect of the present disclosure provides a method of producing heavy lubricating base oil using vacuum-distilled deasphalted oil, including the steps of (a)' introducing atmospheric residual of or a mixture of atmospheric residual oil and vacuum residual oil into a solvent deasphalting apparatus to obtain deasphalted oil; (b)' vacuum-distilling the deasphalted oil to obtain light deasphalted oil and heavy deasphalted oil; (c)' mixing the light deasphalted oil obtained in the step (b)' with vacuum gas oil to prepare a mixture and then hydrogenating and fractionating the mixture to separate the mixture into an oil product and unconverted oil; and (d)' introducing the unconverted oil obtained in the step (c)' into a vacuum distillation process to obtain a lubricating base oil having a predetermined viscosity grade.

According to the present disclosure, when heavy deasphalted oil obtained by vacuum-distilling deasphalted oil is introduced into a catalytic reaction process, high-viscosity heavy lubricating base oil (grade: 150BS), which cannot be obtained by a conventional catalytic reaction process, can be obtained in a high yield. Further, when light deasphalted oil obtained by vacuum-distilling deasphalted oil is introduced into a catalytic reaction process, high-quality heavy lubricating base oils including lubricating oils of Group III can be produced. Further, the grade and production rate of final lubricating base oil can be controlled by adjusting the ratio of atmospheric distilled residual oil to vacuum-distilled residual oil, the separation conditions of vacuum distillation and the like, thus suitably meeting the continuous change in the demand and supply of lubricating base oil in the market.

DETAILED DESCRIPTION

Figure 1:
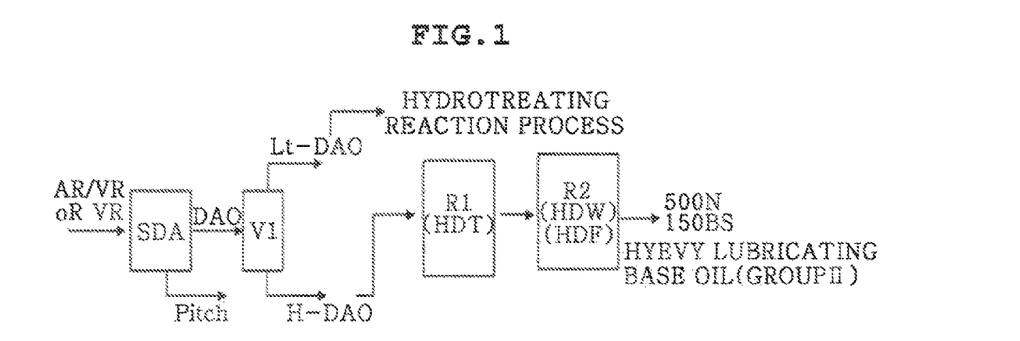
FIG. 1 is a block diagram showing a process of producing heavy lubricating base oil according to the present disclosure, wherein deasphalted oil (DAO) obtained by a solvent deasphalting (SDA) process is separated into heavy deasphalted oil (H-DAO) by a vacuum distillation process, and then the hydrotreatment (HDT), catalytic dewaxing (CDW) and hydrofinishing (HDF) of the heavy deasphalted oil (H-DAO) are sequentially carried out thus producing the heavy lubricating base oil.
Figure 2:
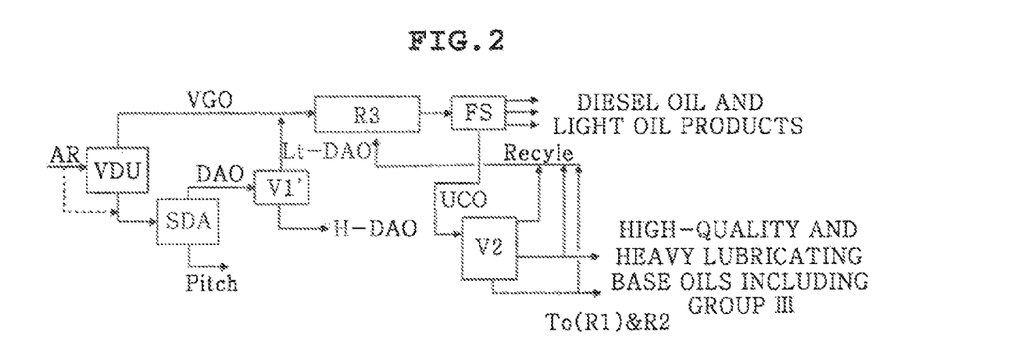
FIG. 2 is a block diagram showing a process of producing high-quality heavy lubricating base oil including lubricating base oil of Group III according to the present disclosure, wherein deasphalted oil (DAO) obtained by a solvent deasphalting (SDA) process is separated into light deasphalted oil (L-DAO) by a vacuum distillation process, and then the hydrogenation process (R3) is carryout out, thus producing the high-quality heavy lubricating base oil of Group III.

The following are descriptions of elements shown in the drawings:
  AR: atmospheric residual oil
  VR: vacuum residual oil
  SDA: solvent deasphalting process
  V1/V1'/V2: vacuum distillation process
  DAO: deasphalted oil
  Lt-DAO: light deasphalted oil
  H-DAO: heavy deasphalted oil
  R1 (HDT): Hydrotreating reaction
  R2: hydrodewaxing process (HDW)/hydrofinishing process (HDF)
  VDU: vacuum distillation process
  VGO: vacuum gas oil
  R3: hydrogenation process
  FS: fractionation
  UCO: unconverted oil As shown in FIGS. 1 and 2, the method of producing heavy lubricating base oil according to the present disclosure includes the steps of introducing a hydrocarbon feedstock into a solvent deasphalting apparatus to obtain deasphalted oil which has reduced asphalt contents; and vacuum-distilling the deasphalted oil to obtain light deasphalted oil and heavy deasphalted oil.

In the present disclosure, the hydrocarbon feedstock introduced into the solvent deasphalting apparatus means fractions which contain significant amount of heteroatomic compounds and aromatic compounds and have a boiling point higher than that of gasoline, such as vacuum residual oil (VR), a mixture (AR/VR) of atmospheric residual oil and vacuum residual oil, or the like. The vacuum residual oil may be obtained by directly vacuum-distilling crude oil or by distilling the atmospheric residual oil separated from an atmospheric distillation tower under reduced pressure.

The hydrocarbon feedstock is introduced into a solvent deasphalting process (SDA) in order to remove asphalt and impurities therefrom. As the solvent used in the solvent deasphalting process (SDA), a normal paraffin-based or isoparaffin-based solvent of 3 to 6 carbon atoms is generally used. Specifically, the solvent is selected from normal propane, normal butane, isobutene, normal pentane, and normal hexane. Further, the yield of deasphalted oil (DAO) to vacuum residual oil (VR) or a mixture (AR/VR) of atmospheric residual oil and vacuum residual oil is changed depending on operation conditions and the kind of solvent. That is, the yield thereof increases as the carbon number of the solvent increases, and is generally 15~80%.

The deasphalted oil produced by the solvent deasphalting process (SDA) contains a relatively small amount of metal and residue carbon, whereas has a large amount of aromatics and a fraction of a high distillation point. The deasphalted oil can be directly used as a raw material for producing heavy lubricating base oil by the following catalytic reaction process, or a raw material for producing high-quality heavy lubricating base oil including lubricating base oil of Group III by the following hydrogenation process. However, in the present disclosure, in order to suitably control the grade and production ratios (or rates) of final lubricating base oils and to produce a lubricating base oil, which is difficult to obtain by conventional technologies, in a high yield, the deasphalted oil is separated into light deasphalted oil and heavy deasphalted oil by vacuum-distilling the deasphalted oil, and then each of the light deasphalted oil and heavy deasphalted oil is used as raw materials for the catalytic reaction process and the hydrogenation process.

The operation conditions of the vacuum distillation process (V1 or V1') can be controlled in various manners depending on the viscosity grade and yield of a target product to be obtained. Preferably, the vacuum distillation process (V1 or V1') is operated at a tower bottom temperature of 350~430° C., a tower bottom pressure of 140~160 mmHg a tower top temperature of 75~95° C. and a tower top pressure of 60~80 mmHg.

The properties of the deasphalted oil (DAO) obtained by mixing atmospheric residual oil (AR) and vacuum residual oil (VR) at a ratio of 1:1 and then performing a solvent deasphalting process (SDA), and the properties of the light deasphalted oil (Lt-DAO) and heavy deasphalted oil (H-DAO) obtained by vacuum-distilling the mixture are shown in Table 1 below.

TABLE 1

| Item | Unit | | Full range DAO | Lt-DAO | H-DAO |
|---|---|---|---|---|---|
| API | 60° F. | | 21.2 | 23.4 | 20.3 |
| Sulfur | wt. % | | 2.8 | 2.6 | 2.9 |
| Nitrogen | wt.ppm | | 930 | 640 | 1420 |
| HPLC (aromatics analysis) | MAH (%) | | 32.0 | 29.4 | 35.5 |
| | DAH (%) | | 10.5 | 12.6 | 11.0 |
| | PAH (%) | | 7.7 | 5.1 | 8.9 |
| | TAH (%) | | 50.2 | 47.1 | 55.4 |
| Distillation (%) ASTM D-2887 | Initial boiling point | | 247 | 227 | 410 |
| | 10% | | 380 | 342 | 481 |
| | 30% | | 446 | 396 | 523 |
| | 50% | | 493 | 428 | 555 |
| | 70% | | 539 | 455 | 586 |
| | 90% | | 606 | 490 | 636 |
| | Final boiling point | | 720 | 572 | 720 |

Referring to the boiling distribution of the deasphalted oil (full range DAO) and heavy deasphalted oil (H-DAO) shown in Table 1 above, it can be seen that heavy deasphalted oil is widely distributed. As a result, when a hydrotreating reaction, a catalytic dewaxing reaction and a hydrofinishing reaction are carried out using the deasphalted oil (full range DAO) as a raw material, high-viscosity heavy lubricating base oil as well as middle-viscosity lubricating base oil of group II (viscosity grade: 60 N~150 N) can be obtained. Particularly, considering market demand and product slate, when heavy deasphalted oil (H-DAO), which can be obtained at the bottom of a tower by vacuum-distilling the deasphalted oil (full range DAO) to separate light deasphalted oil (Lt-DAO) therefrom, is used as a raw material, heavy lubricating base oil, corresponding to 500N and 150BS, can be produced in a high yield. That is, when the vacuum distilled deasphalted oil of the present disclosure is used, heavy lubricating base oil, which was difficult to obtain by a conventional catalytic reaction process, can be obtained in a high yield.

Meanwhile, since the light deasphalted oil (Lt-DAO) as shown in Table 1 has a high paraffin content and a high viscosity index, when this light deasphalted oil (Lt-DAO) is mixed with vacuum gas oil (VGO) and then introduced into a hydrogenation process, the properties of the unconverted oil (UCO) generated in this process is improved, and thus high-quality lubricating base oil including lubricating base of Group III can be produced. Particularly, since the light deasphalted oil (Lt-DAO), unlike the deasphalted oil (full range DAO) produced by a solvent deasphalting process (SDA), is similar to vacuum gas oil (VGO) in terms of impurities (sulfur, nitrogen, carbon residue, etc.) and has a relatively low heavy fraction, it can be mixed with the vacuum gas oil (VGO) without restricting the content thereof and then used (in the case of deasphalted oil (full range DAO), it is limitedly mixed and then used at a ratio of 40% or less.

Hereinafter, the method of producing a lubricating base oil having desired quality by introducing the vacuum-distilled deasphalted oil into a catalytic reaction process (R1 and R2) and a hydrogenation process (R3) according to the present disclosure will be described in detail.

Considering that heavy lubricating base oil generally includes 0.1~0.15 wt % of sulfur, 500~1000 ppm of nitrogen and 10~20 wt % of aromatics, the deasphalted oil (DAO) and heavy deasphalted oil (H-DAO) shown in Table 1 above include as very large amount of impurities and aromatics compared to a general heavy lubricating base oil. Therefore, the raw material of the heavy lubricating base oil can be converted into a product having desired quality when a catalytic reaction is carried out.

In the catalytic reaction process of the present disclosure, a hydrogenation catalyst, a dewaxing catalyst and a hydrofinishing catalyst are used, and a hydrotreating reaction, a catalytic dewaxing reaction and a hydrofinishing reaction are sequentially carried out. In each of the reaction steps constituting the catalytic reaction process, a reaction temperature, a reaction pressure, kind of catalyst, liquid hourly space velocity (LHSV) and a volume ratio of hydrogen to a feedstock are determined depending on the purpose of each reaction step.

First, impurities, such as sulfur, nitrogen, metal, PCA (polycyclic aromatic), etc., are removed from a feedstock by the hydrotreating process (HDT) of the heavy deasphalted oil in the presence of a hydrogenation catalyst, and simultaneously the aromatic components included in the heavy asphalted oil are converted into naphthene components by hydrogen saturation. The hydrotreating process is used to adjust the ratio of paraffin, naphthene and aromatics such that the quality of a lubricating base oil product is improved, and is used to remove impurities such that a high-quality lubricating base oil is obtained. Particularly, the hydrotreating process is mangy intended to remove the impurities, which can be used as a catalyst poison in the subsequent dewaxing (or isomerizing) process and hydrofinishing process, to a target value or less.

The hydrotreating process (HDT) is performed under the conditions of a reaction temperature of 300~410° C., a reaction pressure of 30~220 kg/cm² g, a liquid hourly space velocity (LHSV) of 0.1~3.0 hr$^{-1}$ and a volume ratio of hydrogen to feedstock of 500~3,000 Nm³/m³, and can remarkably reduce the impurities (for example, sulfur, nitrogen, metal) and aromatic compounds of two rings or more included in the feedstock under the optimized conditions. In this case, it is important that, if possible, the severity in the hydrotreating reaction be lowered as long as impurities do not influence the lifecycle of a catalyst of the subsequent step. The reason for this is that, as the severity in the hydrotreating reaction increases, the viscosity of a reaction product is increasingly lowered, and thus loss occurs in terms of the yield of a lubricating base oil product.

The catalyst used in the hydrotreating process may include one or more selected from group 6, 9 and 10 elements in the periodic table, and, preferably, may include one or more selected from Co—Mo, Ni—Mo and combinations thereof. However, the hydrogenation catalyst is not limited thereto, and may be used regardless of the kind thereof as long as it has the desired effects of accelerating a hydrogen saturation reaction and removing impurities.

In the fraction having undergone the hydrotreating reaction, the content of impurities is remarkably reduced, and the content of aromatics has become suitable. Generally, considering the effect of the fraction on the catalyst used in subsequent processes, the fraction may include 350 ppm or less of sulfur (preferably, 100 ppm or less) and 50 ppm or less of nitrogen (preferably, 10 ppm or less).

As such, since the fraction having undergone the hydrotreating, reaction includes a very small amount of impurities, the subsequent catalytic hydrodewaxing reaction (HDW) is conducted more stably and actively, with the result that a yield is high in terms of producing a lubricating base oil (that is, the loss of yield is low), and the selectivity thereof is high, thereby producing a high-quality lubricating base oil.

The hydrotreated fraction is dewaxed in the presence of a dewaxing catalyst. This catalytic dewaxing process according to the present disclosure means a process of reducing or removing N-paraffin deteriorating a low-temperature properties using isomerization or cracking. Therefore, when the hydrotreated fraction undergoes the dewaxing reaction process, it has an excellent low-temperature aspect, thus satisfying the specification of the pour point of lubricating base oil.

The catalytic dewaxing process is performed under the conditions of a reaction temperature of 250~410° C., a reaction pressure of 30~200 kg/cm² g and a liquid hourly space velocity (LHSV) of 0.1~3.0 hr$^{-1}$ and a volume ratio of hydrogen to feedstock of 150~1000 Nm³/m³.

The catalyst used in the catalytic dewaxing process includes a carrier and a metal supported in the carrier. The carrier has an acid site, and is selected from a molecular sieve, alumina, and silica-alumina. The molecular sieve means crystalline aluminosilicate (zeolite), SAPO, ALPO or the like. This molecular sieve includes a medium-pore molecular sieve having a 10-membered oxygen ring, such as SAPO-11, SAPO-41, ZSM-11, ZSM-22. ZSM-23, ZSM-35, ZSM-48 or the like, and a large-pore molecular sieve having a 12-membered oxygen ring, such as FAU, Beta, MOR or the like.

The metal used in the dewaxing catalyst may be a metal having a hydrogenation function selected from group 2, 6, 8, 9 and 10 metals. Particularly, the group 9 and 10 (i.e., group VIII) metals may include Co, Ni, Pt and Pd, and the group 6 (i.e., group VIB) metals may include Mo and W.

The deasphalted oil (DAO) used as a feedstock in the catalytic dewaxing process includes a relatively large amount of paraffin because it is produced from the top of an extraction tower in the solvent asphalting process (SDA). For this reason, a catalyst having relatively strong cracking ability (Ni (Co)/Mo(W)) can be used as the dewaxing catalyst. However, when this catalyst (Ni(Co)/Mo(W)) is used, the yield and viscosity of a lubricating base oil may be reduced, so it is preferred that an isomerization catalyst (group 10 metal) for improving a our point by isomerizing N-paraffin into isoparaffin be used.

The dewaxed fraction is hydrofinished in the presence of a hydrofinishing catalyst. The hydrofinishing process is a process of removing olefins and polycyclic aromatics from the dewaxed fraction in the presence of a hydrofinishing catalyst according to the specification of each target product to assure stability, particularly, a process of finally controlling aromatic content and gas absorptivity in case of the preparation of a naphthene-based lubricating base oil. Generally, the hydrofinishing process is performed under the conditions of a reaction temperature of 150~300° C., a reaction pressure of 30~200 kg/cm$^2$ g and a liquid hourly space velocity (LHSV) of 0.1~3.0 hr$^{-1}$ and a volume ratio of hydrogen to the fraction of 300~1500 Nm$^3$/m$^3$.

The catalyst used in the hydrofinishing process includes a carrier and a metal supported in the carrier. The metal may include at least one metal having a hydrogenation function selected from group 6, 8, 9, 10 and 11 elements. Preferably, the metal may be selected from metal sulfides of Ni—Mo, Co—Mo and Ni—W and precious metals such as Pt and Pd.

Further, as the carrier of the catalyst used in the hydrofinishing process, silica, alumina, silica-alumina, titania, zirconia or zeolite, each of which has a large surface area, may be used. Preferably, alumina or silica-alumina may be used. The carrier serves to improve hydrogenation performance by increasing the dispersity of the metal. It is important to control the acid site of the carrier in order to prevent a reaction product from cracking and coking.

The distillate having undergone all of the hydrotreating process (HDT), catalytic dewaxing process (CDW) and hydrofinishing process (HDF) can be directly used as heavy lubricating base oil. However, the distillate is fractionated by fractionator such that it can be separated into heavy lubricating base oils according to the use and viscosity grade thereof. Owing to this fractionation of the distillate, lubricating base oil products having various viscosity grades can be finally obtained. Particularly, the heavy lubricating base oil includes heavy lubricating base oil having a kinetic viscosity of 500~600 cSt (for example, 500BS) at 40° C., and thus this heavy lubricating base oil can be used in desired fields.

Meanwhile, the light deasphalted oil (Lt-DAO) obtained by the vacuum distillation of the deasphalted oil (DAO) at the top of a tower is mixed with vacuum gas oil (VGO) to be converted into light and heavy hydrocarbons by a hydrogenation process.

The hydrogenation process (R3) includes a hydrotreating process and a hydrocracking process, and each process is operated in a once-through mode or a recycle mode, and may be variously configured in one step or two steps. In the case where vacuum gas oil (VGO) and light deasphalted of (Lt-DAO), which are raw materials in the hydrogenation process (R3), are mixed, when the amount of vacuum gas oil (VGO) becomes high, the production of high-quality lubricating base oil increases, and when the amount of light deasphalted oil (Lt-DAO) becomes high, the production of high-quality lubricating base oil and heavy lubricating base oil including Group III lubricating base oil increases. Moreover, as the light deasphalted oil (Lt-DAO) used as a raw material in the present disclosure, a light fraction obtained by the vacuum distillation of deasphalted oil (full range DAO) is used, so the amount of impurities in the light fraction is similar to that of impurities in the vacuum gas oil (VGO), and the amount of heavy end tail in the light distillation fraction is similar to or slightly higher than that of heavy end tail in the vacuum gas oil (VGO), with the result that the vacuum gas oil (VGO) and the light deasphalted oil (Lt-DAO) can be mixed without limitation.

The produced light and heavy hydrocarbons are separated into an oil product (or converted oil) and unconverted oil (UCO) by a series of fractionations (Fs). All or a part of the separated unconverted oil (UCO) is introduced into a second vacuum distillation process (V2), and Group III high-quality lubricating base oil and Group III heavy lubricating base oil can be obtained in a high yield. The lubricating base oil obtained by the method of the present disclosure may include lubricating base oil having a kinetic viscosity of 3.0 to 11.0 cSt at 100° C., particularly, lubricating base oil having a kinetic viscosity of 9.0 to 11.0 cSt, which is difficult to obtain in a high yield by conventional methods. The method of producing lubricating base oil by vacuum-distilling the unconverted oil obtained by a hydrogenation process and the operation conditions thereof are disclosed in Korean Unexamined Patent Application Publication No. 2003-0073026, filed by the present applicant, which is hereby incorporated by reference herein in its entirety.

According to an embodiment of the present disclosure, as shown in FIG. 2, the light deasphalted oil (Lt-DAO) and vacuum gas oil (VGO), which are raw materials introduced into a hydrogenation reaction process, are products obtained by vacuum-distilling atmospheric residual oil. That is, atmospheric residual oil (AR) is distilled by a vacuum distillation process (VDU) to be separated into vacuum gas oil (VGO) and vacuum residual oil (VR), the vacuum residual oil (VR) is separated into heavy deasphalted oil (H-DAO) and light deasphalted oil (Lt-DAO) by a solvent deasphalting process (SDA) and a vacuum distillation process (V1'), and then the vacuum gas oil (VGO) is mixed with the light deasphalted oil (Lt-DAO) to allow the mixture to be used as the raw material introduced into the hydrogenation process.

In this case, the process of obtaining heavy lubricating base oil from the heavy deasphalted oil (H-DAO) can be integrated with the process of obtaining Group III high-quality lubricating base oil and Group III heavy lubricating base oil. As such, when the two different processes are integrated with each other by the vacuum-distilled deasphalted oil of the present disclosure, the grade and production ratio of the final lubricating base oil can be controlled by adjusting the ratio of atmospheric residual oil to vacuum residual oil and the separation conditions of the vacuum distillation process and the like. Consequently, the method of producing lubricating base oil according to the present disclosure can suitably meet the demand and supply of lubricating base oil in the market, and can reduce production cost, thus improving economic efficiency.

Hereinafter, the present disclosure will be described in more detail with reference to the following Examples. However, the scope of the present disclosure is not limited to these Examples.

Example 1

Preparation of Heavy Lubricating Base Oil from Heavy Deasphalted Oil (H-DAO)

The heavy deasphalted oil (H-DAO) shown in Table 1 above was used as a raw material in a hydrotreating process. The hydrotreating process was performed in the presence of a commonly-used catalyst having hydrodesulfurization (HDS), hydrodenitrogenation (HDN) and hydrometallization (HDM) functions under the conditions of a reaction temperature of 350~360° C., a reaction pressure of 150 kg/cm$^2$g, a liquid hourly space velocity (LHSV) of 0.5~1.0 hr$^{-1}$, and a ratio of hydrogen to oil of 1,000~1,500 NL/L to obtain a fraction including 50 ppm or less of sulfur and 5 ppm or less of nitrogen.

Subsequently, a catalytic dewaxing process and a hydrofinishing process were carried out using the fraction obtained by the hydrotreating process. In the catalytic dewaxing process, Pt/zeolite was used as an isomerization catalyst, and, in the hydrofinishing process, (pt/pd)/Al$_2$O$_3$ was used as a catalyst. Each of the catalytic dewaxing process and the hydrotreating process was performed at a reaction pressure of 140~150 kg/cm$^2$g, an LSHV of 1.0~2.0 hr$^{-1}$ and a ratio of hydrogen to oil of 400~600 Nm$^3$/m$^3$. Further, the catalytic dewaxing process was performed at a reaction temperature of 330~360° C., and the hydrofinishing proems was performed at a reaction temperature of 200~250° C. In the catalytic dewaxing process, the reaction temperature was controlled such that the pour point of the distillate obtained in this process was −20° C. or lower.

Table 2 below shows the results of comparing the aspects of the raw material with those of the reaction product having undergone hydrotreating/dewaxing/hydrofinishing processes (before fractionation).

TABLE 2

|  |  | H-DAO | Fraction after reaction |
|---|---|---|---|
| Pour Pt. | ° C. | 57 | −23 |
| Kvis | 40° C. | — | 75.6 |
|  | 100° C. | 29.2 | 11.3 |
| Sulfur | wt.ppm | 29,000 | 0.78 |
| Nitrogen | wt.ppm | 1,420 | 0.5 |
| HPLC | MAH % | 35.5 | 0.8 |
| (aromatic analysis) | DAH % | 11.0 | 0.01 |
|  | PAH % | 8.9 | 0.01 |
|  | TAH % | 55.4 | 0.802 |
| Distillation (%) D-2887 | Initial boiling point | 410 | 188 |
|  | 10% | 481 | 334 |
|  | 30% | 523 | 470 |
|  | 50% | 555 | 523 |
|  | 70% | 586 | 563 |
|  | 90% | 636 | 612 |
|  | Final boiling point | 720 | 685 |

As shown in Table 2 above, the entire fraction can be directly used as a product because the fraction has a high viscosity grade (K-Vis@40° C.) of 75~80, but the fraction may also be separated into final heavy lubricating base oil by a fractionation process in oilier to obtain high viscosity grade products such as 500N and 150BS. The properties of the finally-separated naphthene-based lubricating base oil are shown in Table 3 below. It can be ascertained from Table 3 that the yield of heavy lubricating base oil (500N and 150BS) is 75~80%.

TABLE 3

|  |  | 500N | 150BS |
|---|---|---|---|
| Kvis | 40° C. | 95~98 | 568.5 |
|  | 100° C. | 10.65 | 32.1 |
| Pour Pt. | ° C. | −18 | −10 |
| HPLC | MAH % | 0.9 | 0.8 |
| (aromatic analysis) | DAH % | 0.3 | 0.3 |
|  | PAH % | 0.1 | 0.2 |
|  | TAH % | 1.3 | 1.3 |

Comparative Example 1

Preparation of Lubricating Base Oil from Distillate (DAO not having Undergone Vacuum Distillation) Obtained by Solvent Deasphalting Process The deasphalted oil (full range DAD) shown in Table 1 above was used as a raw material in a hydrotreating process. The hydrotreating process was performed in the presence of a commonly-used catalyst having hydrodesulfurization (HDS), hydrodenitrogenation (HDN) and hydrodemetallization (HDM) functions under the conditions of a reaction temperature of 350~360° C., a reaction pressure of 150 kg/cm$^2$g, a liquid hourly space velocity (LHSV) of 0.5~1.0 hr$^{-1}$, and a ratio of hydrogen to oil of 1,000~1,500 NL/L to obtain a fraction including 50 ppm or less of sulfur and 5 ppm or less of nitrogen.

Subsequently, a catalytic dewaxing process and a hydrofinishing process were carried out using the fraction obtained by the hydrotreating process. In the catalytic dewaxing process, Pt/zeolite was used as an isomerization catalyst, and, in the hydrofinishing process, (pt/pd)/Al$_2$O$_3$ was used as a catalyst. Each of the catalytic dewaxing process and the hydrotreating process was performed at a reaction pressure of 140~150 kg/cm$^2$g, an LSHV of 1.0~2.0 hr$^{-1}$ and a ratio of hydrogen to oil of 400~600 Nm$^3$/m$^3$. Further, the catalytic dewaxing process was performed at a reaction temperature of 310~340° C., and the hydrofinishing process was performed at a reaction temperature of 200~250° C. In the catalytic dewaxing process, the reaction temperature was controlled such that the pour point of the distillate obtained in this process was −40° C. or lower.

Table 4 below shows the results of comparing the aspects of the raw material with those of the reaction product having undergone hydrotreating/dewaxing/hydrofinishing processes (before fractionation).

TABLE 4

|  |  | Full range DAO | Fraction after reaction |
|---|---|---|---|
| Pour Pt. | ° C. | +48 | −40 |
| Kvis | 40° C. | 237.6 | 32.54 |
| Sulfur | 100° C. | 13.5 | 4.131 |
| Nitrogen | wt.ppm | 2.8 | 5.9 |
| HPLC | wt.ppm | 930 | 0.5 |
| (aromatic analysis) | MAH % | 32.0 | 2.5 |
|  | DAH % | 10.5 | — |
|  | PAH % | 7.7 | 0 |
|  | TAH % | 50.2 | 2.5 |
| Distillation (%) D-2887 | Initial boiling point | 247 | 55.6 |
|  | 10% | 380 | 256.4 |
|  | 30% | 446 | 365.2 |
|  | 50% | 493 | 428.6 |
|  | 70% | 539 | 486.2 |
|  | 90% | 606 | 536.0 |
|  | Final boiling point | 720 | 607.0 |

As shown in Table 4 above, it can be ascertained that the reaction product includes a large amount of low viscosity grade lubricating base oil or middle viscosity grade lubricating base oil, considering that K-Vis@40° C. is about 32.5 and K-Vis@100° C. is about 4.1 (when only the H-DAO of Example was treated, most of the reaction product was heavy lubricating base oil (500N or more), considering that K-Vis@40° C. was 75.6). The entire fraction as classified according to the viscosity grade. As a result, the product group shown in Table 5 below was obtained.

TABLE 5

|  |  | 60/70N | 100N | 150N | 500N | 150BS |
|---|---|---|---|---|---|---|
| Kvis | 40° C. | 13.3 | 22.5 | 31.6 | 95~98 | 568.5 |
| Pour Pt. | 100° C. | 3.0 | 4.1 | 5.1 | 10.7 | 32.1 |
|  | ° C. | −28 | −15 | −15 | −18 | −10 |

From Table 5 above, it can be seen that light lubricating oil or middle lubricating base oil, such as 60/70N, 100N or 150N, was prepared in an amount of 40~45%, and heavy lubricating base oil of 500N or more was prepared in an amount of 30% or less, which was relatively low. Consequently, it can be ascertained from Example 1 and Comparative Example 1 that, when the vacuum-distilled heavy deasphalted oil of the present disclosure is used, the heavy lubricating base oil of 500N or more can be obtained in a high yield compared to the deasphalted oil not having undergone vacuum distillation.

Example 2

Preparation of Group III High-Quality Lubrication Base Oil and Group III Heavy Lubricating Base Oil Form Light Deasphalted Oil (Lt-DAO)

A raw material was prepared by mixing the vacuum gas oil (VGO) and light deasphalted oil (Lt-DAO) having properties shown in Table 6 below at a weight ratio of 6:4.

TABLE 6

|  |  | VGO | Lt-DAO | UCO |
|---|---|---|---|---|
| API specific gravity | 60° F. | 20.5 | 21.4 | −23 |
| Kvis | 100° C. (cSt) | 7.81 | 5.93 | 5.7 |
| Sulfur | wt. % | 2.8 | 2.6 | 0.0053 |
| Nitrogen | wt.ppm | 945 | 640 | 7 |
| Distillation (%) D-2887 | Initial boiling point | 237.0 | 227 | 355 |
|  | 10% | 355.5 | 342 | 383 |
|  | 30% | 410.5 | 396 | 418 |
|  | 50% | 444.0 | 438 | 452 |
|  | 70% | 478.5 | 485 | 502 |
|  | 90% | 520.5 | 530 | 554 |
|  | Final boiling point | 549.9 | 582 | 635 |

In the hydrotreating reaction process, the prepared raw material was treated using a hydrotreating (HDT) catalyst having hydrodemetallization (HDM), hydrodesulfurization (HDS), hydrodenitrogenation (HDN) and hydrodecarbonization (HDCCR) functions under the conditions of a liquid hourly space velocity (LHSV) of 15 hr$^{-1}$, a reaction temperature of 370~390° C., a reaction pressure of 15.0 MPa and a ratio of hydrogen to oil of 1,500 NL/L to obtain a fraction. Subsequently, in the hydrocracking reaction process, the fraction obtained from the hydrotreating reaction process was treated together with recycled unconverted oil (UCO) using a hydrocracking (HDC) catalyst under the conditions of an LHSV of 0.85 hr$^{-1}$, a reaction temperature of 380~400° C., a reaction pressure of 15.0 MPa and a ratio of hydrogen to oil of 1,500 NL/L.

After the hydrotreating reaction and hydrocracking reaction, diesel oil and light oil products having a boiling point of 350° C. or lower were recovered from the fraction by a general separator and a series of fractionation processes, and unconverted oil (UCO) having the aspect shown in Table 6 above was obtained. Thereafter, the unconverted of (UCO) was introduced into a second vacuum distillation process (V2) and was then vacuum-distilled at a tower top temperature of 80~90° C., a tower top pressure of 65~80 mmHg, a rower bottom temperature of 350° C. and a tower bottom pressure of 120 mmHg to obtain 33 vol % of a light distillate, 28 vol % of a 100N distillate, 22 vol % of a 150N distillate, 13 vol % of a 500N distillate and 4 vol % of final residual oil.

Among them, the 100N, 150N, 250N and 500N distillates were recovered as an intermediate product, and the light distillate and final residual oil were recycled into a hydrogenation reaction process (R3). Consequently, Group III lubricating base oil products having high viscosity indexes of 100N, 150N and 250N grades and a heavy lubricating base oil product having a high viscosity index of a 500N grade were obtained.

TABLE 7

|  |  | Light distillate | 100N distillate | 150N distillate | 250N distillate | 500N distillate |
|---|---|---|---|---|---|---|
| API specific gravity | 60° F. | 37.9 | 37.2 | 35.9 | 34.9 | 31.2 |
| Pour Pt. | ° C. | 18 | 36 | 48 | 51 | 58 |
| Viscosity index (VI) |  | 105 | 122 | 127 | 131 | 134 |
| Kvis | 100° C.(cSt) | 2.8 | 4.2 | 6.6 | 7.5 | 10.6 |
| Distillation (%) D-2887 | Initial boiling point | 284.4 | 355.4 | 396.8 | 340.2 | 493.3 |
|  | 10% | 340.0 | 395.4 | 437.2 | 439.7 | 522.7 |
|  | 30% | 367.4 | 413.0 | 456.2 | 468.4 | 541.3 |
|  | 50% | 381.6 | 424.4 | 472.0 | 487.8 | 569.1 |
|  | 70% | 394.0 | 436.0 | 490.8 | 505.0 | 590.0 |
|  | 90% | 408.8 | 454.0 | 523.4 | 531.6 | 618.0 |
|  | Final boiling point | 452.8 | 504.8 | 587.4 | 593.2 | 638.2 |

Although the foregoing examples of the present disclosure have been provided for illustrative purposes, they should in no way be construed as limiting. Indeed, those skilled in the art will appreciate that various modifications, additions and substitutions are possible, without departing from the scope and spirit of the subject matter described herein. Further, although reference to particular means, materials and embodiments are show/described, there is no limitation to the particulars disclosed herein. Rather, the embodiments extend to all functionally equivalent structures, methods, and uses, such as are within the scope of the appended claims.

The invention claimed is:

1. A method of producing heavy lubricating base oil using vacuum-distilled deasphalted oil, comprising the steps of:
   (a) introducing atmospheric residual oil or mixture of atmospheric residual oil and vacuum residual oil into a solvent deasphalting apparatus to obtain deasphalted oil;
   (b) vacuum-distilling the deasphalted oil to obtain light deasphalted oil and heavy deasphalted oil;
   (c) hydrotreating the heavy deasphalted oil obtained in the step (b) in the presence of a hydrogenation catalyst to obtain a hydrotreated fraction;
   (d) dewaxing the hydrotreated fraction obtained in the step (c) in the presence of a dewaxing catalyst; and
   (e) hydrofinishing the dewaxed fraction obtained in the step (d) in the presence of a hydrofinishing catalyst.

2. The method of claim 1, further comprising the step: (f) fractionating the hydrofinished fraction obtained in the step (e) according to a viscosity range to obtain heavy lubricating base oil.

3. The method of claim 2, wherein the heavy lubricating base oil obtained in the step (f) comprises heavy lubricating base oil having a kinetic viscosity of 500~600 cSt at 40° C.

4. The method of claim 1, wherein, in the step (c), the hydrotreating of the heavy deasphalted oil is performed under the conditions of a reaction temperature of 300 to 410° C., a reaction pressure of 30 to 220 kg/cm$^2$g and a liquid hourly space velocity (LHSV) of 0.1 to 3.0 hr$^{-1}$, and the hydrogenation catalyst includes one or more metals selected from group 6 and 8 to 10 elements in the periodic table.

5. The method of claim 1, wherein, in the step (d), the dewaxing is performed under the conditions of a reaction temperature of 250 to 410° C., a reaction pressure of 30 to 200 kg/cm$^2$g and a liquid hourly space velocity (LHSV) of 0.1 to 3.0 hr$^{-1}$, and the dewaxing catalyst includes one or more earners selected from molecular sieve, alumina and silica-alumina, and one or more metals selected from group 2, 6, 9 and 10 elements in the periodic table.

6. The method of claim 5, wherein the dewaxing catalyst comprises one or more carriers selected from SAPO-11, SAPO-41, ZSM-5, ZSM-11, ZSM-22, ZSM-23, ZSM-48, FAU, BETA and MOR, and one or more metals selected from platinum, palladium and nickel.

7. The method of claim 1, wherein, in the step (e), the hydrofinishing is performed under the conditions of a reaction temperature of 150 to 300° C., a reaction pressure of 30 to 200 kg/cm$^2$g and a liquid hourly space velocity (LHSV) of 0.1 to 3.0 hr$^{-1}$, and the hydrofinishing catalyst comprises one or more carriers selected from silica, alumina, silica-alumina, titania, zirconia and zeolite, and one or more metals selected from group 6, 8, 9, 10 and 11 elements in the periodic table.

8. A method of producing heavy lubricating base oil using vacuum-distilled deasphalted oil, comprising the steps of:
   (a) introducing atmospheric residual oil or a mixture of atmospheric residual oil and vacuum residual oil into a solvent deasphalting apparatus to obtain a deasphalted oil;
   (b) vacuum-distilling the deasphalted oil to obtain light deasphalted oil and heavy deasphalted oil;
   (c) mixing the light deasphalted oil obtained in the step (b) with vacuum gas oil to prepare a mixture and then hydrogenating and fractionating the mixture to separate the mixture into an oil product and unconverted oil; and
   (d) introducing the unconverted oil obtained in the step (c) into a vacuum distillation process to obtain a lubricating base oil having a predetermined viscosity grade.

9. The method of claim 8, wherein the vacuum residual oil of the step (a) and the vacuum gas oil of the step (c), respectively, are obtained by vacuum-distilling the atmospheric residual oil of the step (a).

10. The method of claim 9, wherein the lubricating base oil having a predetermined viscosity grade, obtained in the step (d), comprises lubricating base oil having a kinetic viscosity of 9.0~11.0 cSt at 100° C.

11. The method of claim 8, wherein the lubricating base oil having a predetermined viscosity grade, obtained in the step (d), comprises lubricating base oil having a kinetic viscosity of 9.0~11.0 cSt at 100° C.

* * * * *

UNITED STATES PATENT AND TRADEMARK OFFICE
CERTIFICATE OF CORRECTION

PATENT NO. : 8,834,706 B2  
APPLICATION NO. : 13/701528  
DATED : September 16, 2014  
INVENTOR(S) : Noh et al.

Page 1 of 1

It is certified that error appears in the above-identified patent and that said Letters Patent is hereby corrected as shown below:

In the Specification,

In Column 12

At line 6, please change "15 $hr^{-1}$" to -- 1.5 $hr^{-1}$ --; and

At line 18, please change "350° C" to -- 360° C --.

Signed and Sealed this  
Twelfth Day of May, 2015

Michelle K. Lee  
*Director of the United States Patent and Trademark Office*